United States Patent [19]
Phelan

[11] Patent Number: 4,497,979
[45] Date of Patent: Feb. 5, 1985

[54] METHOD FOR PROCESSING ESSENTIAL LINES IN A COMMUNICATION SYSTEM

[75] Inventor: James J. Phelan, Downers Grove, Ill.

[73] Assignee: AT&T Bell Laboratories, Murray Hill, N.J.

[21] Appl. No.: 574,661

[22] Filed: Jan. 27, 1984

[51] Int. Cl.³ .............................................. H04Q 3/64
[52] U.S. Cl. .............................. 179/18 D; 179/18 ES; 370/62
[58] Field of Search ........................ 179/18 D, 18 ES; 370/62, 63

[56] References Cited
U.S. PATENT DOCUMENTS

| 3,475,560 | 10/1969 | Kneisel et al. | 370/62 |
| 3,588,369 | 6/1971 | Lee et al. | 179/18 D |
| 3,723,659 | 3/1973 | Budrys et al. | 179/18 HA |

FOREIGN PATENT DOCUMENTS 2534101  2/1977  Fed. Rep. of Germany ... 179/18 D

Primary Examiner—Thomas W. Brown
Attorney, Agent, or Firm—C. H. Davis

[57] ABSTRACT

A telephone switching office having essential service protection is disclosed. As each service request is received it is put in a common queue. Periodically, and regardless of the load, the common queue is examined for requests that have not been served with a given time interval. If these requests are from essential lines, they are put in a special queue. When a server, such as a digit receiver or processor is available the special queue is served prior to the common queue.

6 Claims, 6 Drawing Figures

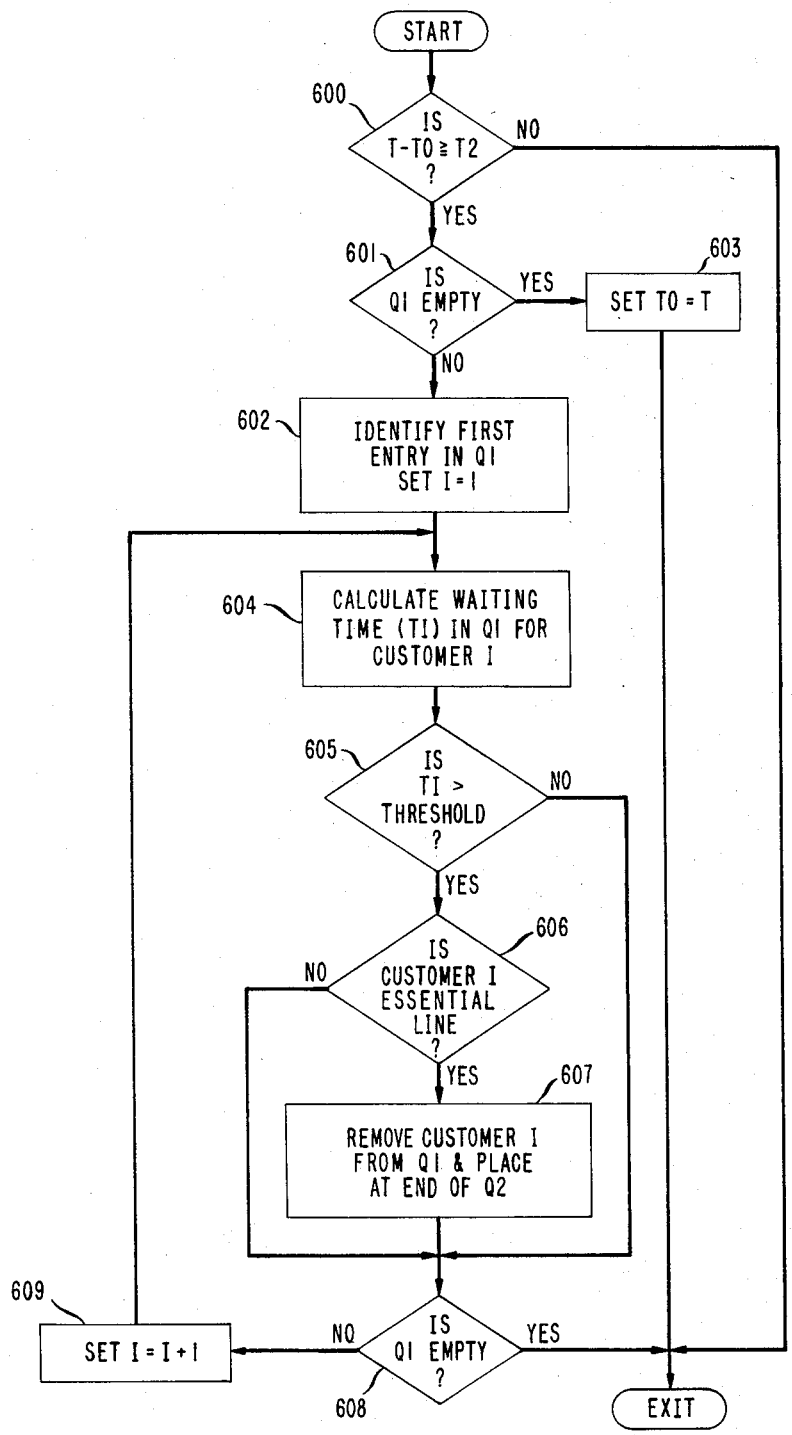

METHOD FOR PROCESSING ESSENTIAL LINES IN A COMMUNICATION SYSTEM

TECHNICAL FIELD

This invention relates to telecommunication systems and particularly to an arrangement for processing customer service requests.

In a more particular aspect, this invention relates to method and apparatus for processing requests for service from telecommunication lines having different classes of service.

In a still more particular aspect, this invention relates to method and apparatus for expeditiously processing service requests from essential lines in a telecommunication system.

BACKGROUND OF THE INVENTION

In telecommunication systems, customers are provided with different classes of service depending on their particular needs. Certain customers such as the police and fire departments are provided with so-called "essential lines" which, among other things, assure these customers of access to the network during overload periods.

While most switching offices in a telecommunication network are designed to handle the expected traffic load during the busiest hours, circumstances such as bad snow storms, hurricanes, local catastrophes, etc., may overload the system beyond the load expected during the normal busy period. Under such overload conditions, service may be degraded to the point where delays in getting dial tone are experienced by the customers.

In modern electronic switching systems, lines initiating a service request are first put in a queue waiting to be served by the common control equipment. When the line is ready to be served, the common control equipment removes the line from the queue and connects the line to a digit receiver. The digit receiver transmits dial tone over the calling line to the customer station and is equipped to store the digits transmitted from the customer station. The time interval between the initiation of a service request by a customer and the provision of dial tone is generally used as a measure of the load on a system. Thus, overloads are sometimes defined in the terms of the number of consecutive calls experiencing long dial tone delays recorded at a particular time in the switching system.

In certain prior art switching systems, a first-in/first-out (FIFO) queue was used to store the identity of lines waiting for service. With a FIFO queue, the line waiting the longest was served first and everyone was more or less equally delayed in getting dial tone. In one known system using a FIFO queue, a line load control machine mechanism was actuated when a predetermined number of consecutive long dial tone delays was experienced.

In this system, the line load control was implemented by a technique employing a rotating mask which limited the number of lines that could originate calls. As the load increased, more nonessential lines were masked or blocked until a limit was reached whereby only essential lines were being served.

While this arrangement was suitable for its intended purpose, it was not without problems. For example, when the mask was rotated those lines previously blocked would exhibit a significant increase in the number of ineffective attempts due to the delay in dial tone they experienced. Also, the call processor was subject to an oscillating load condition. More specifically, when the rotating mask was in effect, the overload condition which initiated the line load control was suppressed. This led to a false termination of a line load control and removal of the mask only to have the overload condition reappear.

In the alternative to the FIFO queue, some switching systems use a last-in/first-out (LIFO) queue for processing service requests. With the LIFO queue, the last line requesting service is served first, and older service requests are pushed down in the queue and may experience longer delays.

It was found in these systems using a LIFO queue, that the line load control mechanism was hardly ever actuated since the control mechanism was triggered only after a predetermined number of consecutive dial tone delays was detected, and this was unlikely to occur using the LIFO queue. Accordingly, the line load control was virtually ineffective and essential lines were denied preferential treatment during overloads.

SUMMARY OF THE INVENTION

These and other problems are solved and the technical advances achieved by improved method and apparatus for performing line load control in order to give preferential service to special classes of customer lines. The improved method is sometimes referred to as essential service protection.

More specifically and in accordance with the illustrative embodiment of the invention, all classes of customer lines initiating a service request are put in a common queue together with a time stamp marking their arrival time. Periodically, the queue is searched for all entries of essential lines that have waited longer than a predetermined time interval. These essential lines are then placed on a second queue in the order of their original arrival, and given special treatment in the second queue. In particular, the second queue is served prior to the first queue, thus assuring that the essential lines receive preferential treatment.

In accordance with a feature of the invention, essential service protection is automatically implemented since the first queue is periodically searched regardless of the number of service requests.

BRIEF DESCRIPTION OF THE DRAWING

FIGS. 4–6 show a flow diagram of the overall operation of the switching system with respect to requests for service from customer lines.

DETAILED DESCRIPTION

The invention is useful in a processor-controlled telephone switching system such as the system disclosed in U.S. Pat. No. 4,322,843, issued to H. J. Beuscher et al. on Mar. 30, 1982. While a detailed description of the Beuscher et al. system is not necessary for a complete understanding of the present invention, a brief description of that system will now be given in order for the reader to appreciate the environment in which the present invention is applicable.

Figure 1:
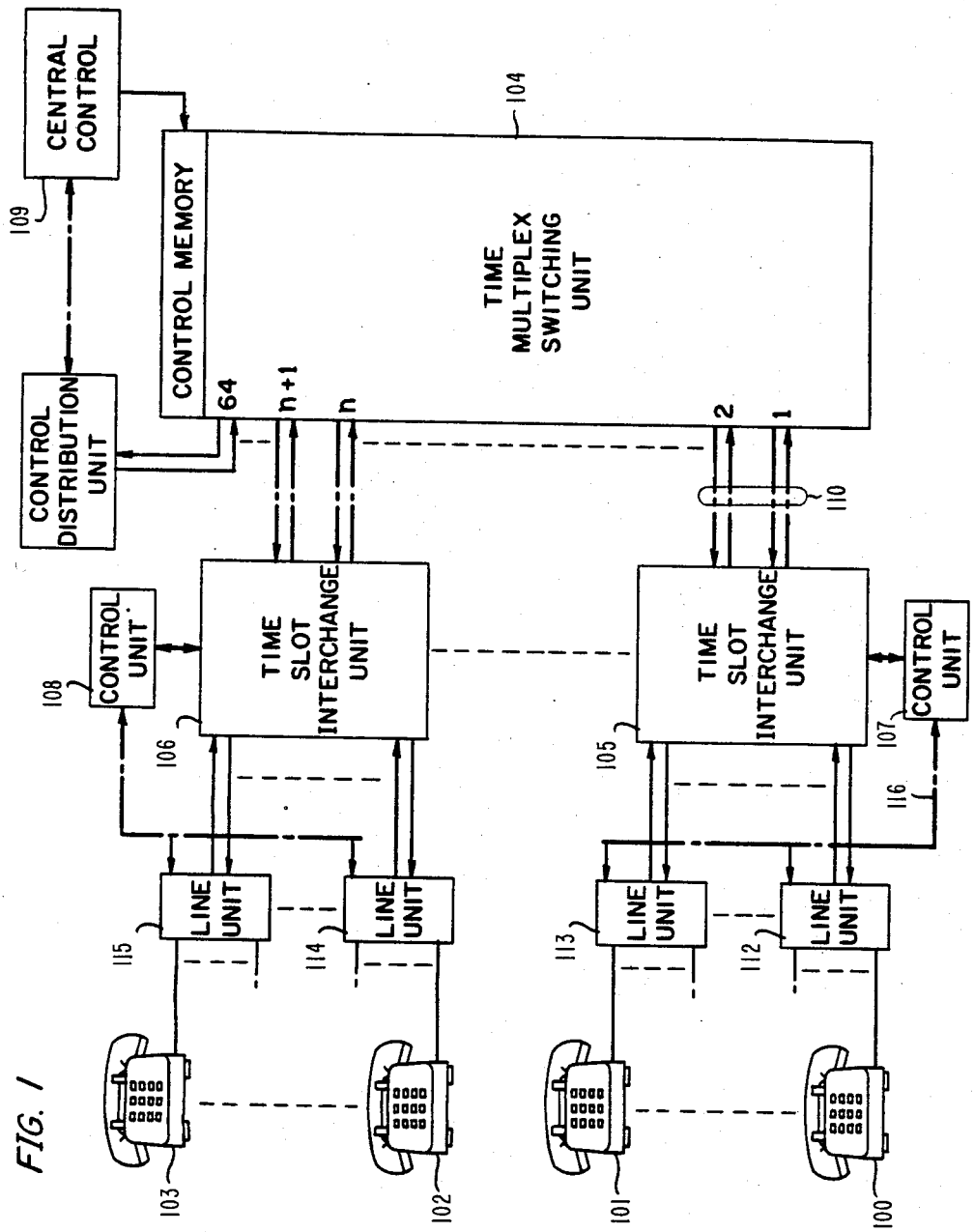
FIG. 1 shows a block diagram of a typical telephone switching system employing the invention.

FIG. 1 shows a portion of the Beuscher et al. disclosure and is a block diagram of a time division switching system for interconnecting a plurality of customer stations 100–103. The system includes a time multiplex switch unit 104 and a plurality of time slot interchange units such as 105 and 106 which are coupled to the time multiplex switching unit via a pair of input-output ports. Each time slot interchange unit is uniquely associated with a control unit and each control unit contains a processor, memory, interface circuitry, etc. for controlling its associated time slot interchange unit.

The processor designated central control 109, which performs certain administration functions for the switching system, exchanges control messages with control units 107 and 108 utilizing selected control channels such as 110 between the time multiplex switch units and the time slot interchange.

Additionally each time slot interchange unit is connected to a plurality of line units, of which line units 112–115 are shown in FIG. 1, via individual time multiplex lines. In the present embodiment, line units 112 and 113 are connected to time slot interchange unit 105 and line units 114 and 115 are connected to time slot interchange unit 106. Each of the line units of the present embodiment is connected to a number of customer stations of which customer stations 100–103 are shown. Each line unit terminates the analog loop serving the customer station and converts call information including analog speech signals into digital words which are transmitted to its associated time slot interchange unit. Further, each line unit detects service requests from the customer station and generates certain signaling information for those stations. The particular station from which speech samples are taken and encoded and the particular time multiplex channels used to transmit the resulting code between the line unit and its associated time slot interchange unit are determined by the control unit of the associated time slot interchange unit.

Figure 2:
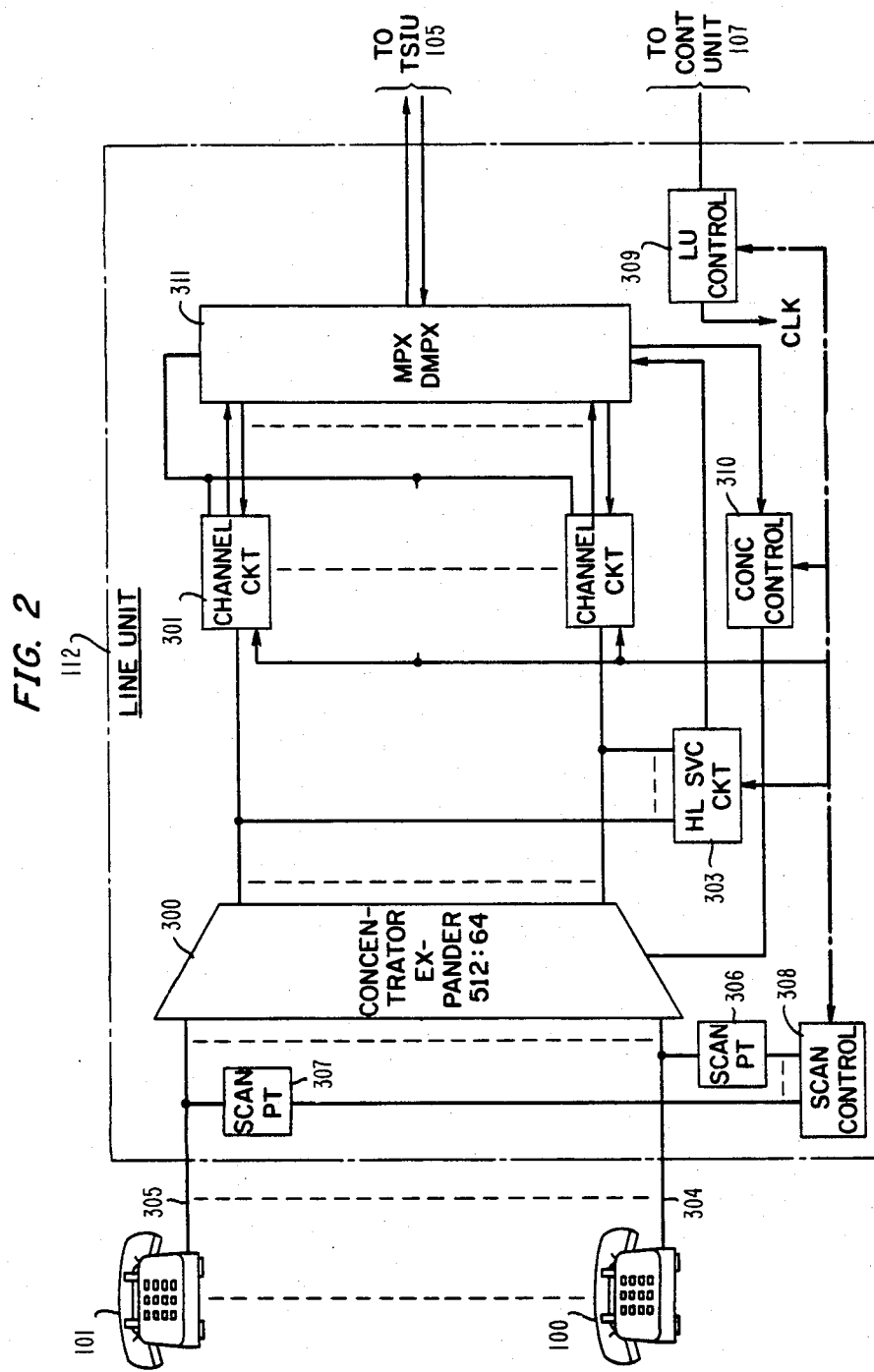
FIG. 2 shows a more detailed block diagram of a line unit of the switching system shown in FIG. 1.

A typical line unit, such as line unit 112, is shown in more detail in FIG. 2. Line unit 112 scans the lines connected to each customer station to detect requests for service. When such a request is detected, line unit 112 transmits to control unit 107 a message indicating the request and the identity of the requesting customer station. This message is transmitted to control unit 107 via a communication path 116 of FIG. 1.

Figure 3:
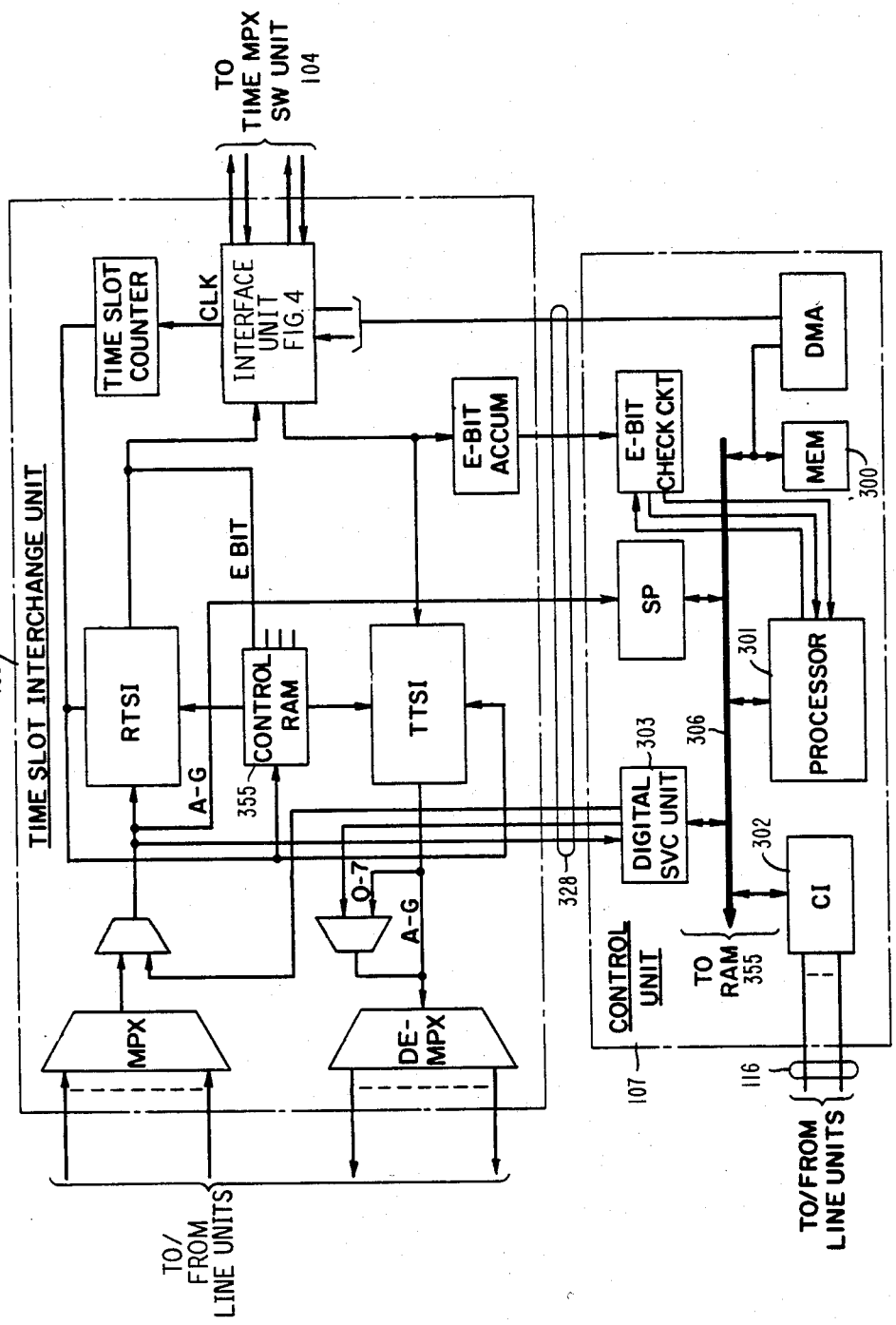
FIG. 3 shows a more detailed block diagram of the time slot interchange and control units of the switching system shown in FIG. 1.

Control unit 107, which is shown in more detail in FIG. 3, performs the necessary translation based on the service request, the identity of the requesting customer and the available equipment. Control unit 107 then transmits a message to line unit 112 via communication path 116 defining which of the plurality of time separated channels between line unit 112 and time slot interchange unit 105 is to be used to transmit information from customer station 100 to time slot interchange unit 112. Based on this message, line unit 112 encodes the analog information from customer station 100 into digital data words and transmits the resulting data words in the assigned channels. In the present embodiment, line unit 112 also transmits in the assigned channel an indication of the direct-current state of the subscriber loop associated with customer station 100.

As noted above, line unit 112 is shown in greater detail in FIG. 2. Up to 512 customer stations such as stations 100 and 101 can be connected to each line unit and these customer stations are connected to the concentrator/expander 300 via subscriber loop circuits of a well-known type. The line unit also includes 64 channel circuits such as 301 and 302 which convert analog information from the customer stations into digital data words before transmission to the switching system and which also convert digital information from the switching system back into analog form for transmission to the customers. Each of the output ports of concentrator/expander 300 also can be connected to a high level service circuit such as 303 which is used, for example, to provide ringing current to the customer station.

Each subscriber line includes a scan point, such as scan point 306 associated with subscriber line 304. The scan point indicates the direct-current state of the line. Control unit 107 periodically scans the subscriber line associated with the customer stations of the switching system by transmitting to the line units, read orders defining the address of a number of scan points to be read. In the present embodiment such a scan order is received by line unit controller 309 which transmits the address and read/write bit portions of the order to scan control unit 308. The scan control unit 308 formulates a reply for the control unit 107 which consists of the present state of the subscriber line indicated by one of the scan points identified in the address portion. Control unit 107 checks the information transmitted from scan control unit 308 to determine if any of the subscriber loops have changed state. If, for example, one of the customer stations has gone off-hook since the last scan, it is necessary to provide a communication path with that customer station through concentrator expander 300 to an available one of the channel circuits such as 301. Accordingly, control unit 107 transmits a write order to concentrator control 310 which responds thereto by connecting the subscriber loop to a predefined output terminal of concentrator expander 300.

As noted above, a typical control unit is depicted in more detail in the block diagram of FIG. 3. Control unit 107 includes a memory 300 which stores the program for the control of its associated control unit and data regarding the primary function of the control unit, its associated time slot interchange unit and its associated customers. Memory 300 stores such information as the class of service a customer has including whether the customer is an essential line customer, mode of signaling toll screening information, and information relating to special services that the customer may have.

As previously stated, control unit 107 controls many of the operations performed by each of the line units. The main processing entity of control unit 107 is processor 301 which operates in response to instructions stored in memory 300. Control unit 107 also includes a control interface circuit 302 which receives instructions from processor 301 via bus 306 and in response thereto communicates with the line units via control bus 116. Control bus 116 comprises a plurality of communication paths at least one of which is uniquely associated with each line unit. Most communication between control unit 107 and line unit controller 309 and line unit 112 is initiated by read or write orders from control unit 107. A read order is a direction to read some identifiable information in line unit 112 and comprises a single bit read indication and the address of the particular information to be read. A write order is a direction to write information into some unit in line unit 112 and comprises a write address, the information to be written, and a one bit write code. The particular unit to be written into in a line unit may be the scan controller 308, the concentrator controller 310 or the high level service circuit 303. The line unit controller 309 partially decodes each order from control unit 107 and directs the remainder of the order and the read/write indicator bit to the particular unit addressed. The particular unit addressed responds to the addressed portion transmitted from control unit 107 and the read/write bit by reading or writing the storage location identified by the address portion. The information read from a particular unit in line unit 112 is returned to line unit controller 309 and transmitted thereby to control unit 107.

Figure 4:
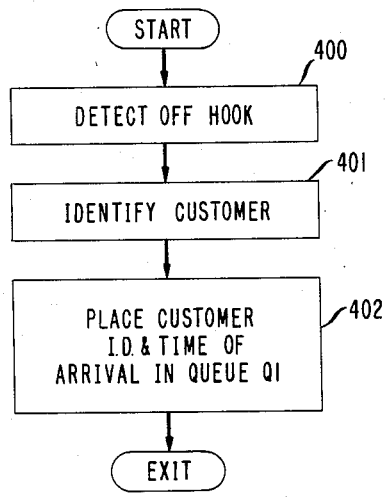

To illustrate how service is provided to essential lines in the illustrative embodiment, a description of the sequence of operation will now be given with respect to flow diagrams of FIGS. 4–6.

Processor 301 in control unit 107 executes a series of program routines that are administered by an executive control program which schedules the various routines. During periods of relatively light traffic all maintenance routines and diagnostic routines can be executed, but as traffic load increases maintenance and diagnostic routines may be deferred.

Thus, periodically processor 301 executes a scan routine by sending a read message to line unit control 309 asking the line unit to read the current status of a group of subscriber loops using the scan control 308. If the reply back from the line unit indicates a customer has gone off hook since the last scan as set forth in box 400, processor 301 identifies the customer and the customer's class of service and enters this information in a queue designated Q1. The current time which is the arrival time of the service request is also entered in the queue as shown in box 402. Processor 301 then returns control to the executive control program which may have the processor continue looking for additional service requests or execute other program routines.

In this illustrative embodiment of the invention a first and second queue designated Q1 and Q2, respectively, have been defined in memory 300 associated with processor 301. These queues are used to keep track of the various lines waiting for service by the switching system. While only two queues are described in this embodiment it would be obvious to those skilled in the art that additional queues can be established for other classes of service depending on the needs of the system.

FIG. 6 shows a flow diagram illustrating the manner in which the queues are administered. Periodically and regardless of the load on the system, the program routine illustrated in FIG. 6 is executed by processor 301. Thus, if the current time T minus T0, which is the time the routine was last executed, is greater than or equal to a predetermined value T2, Q1 is examined as shown in box 601. If Q1 is empty, the time T0 is reset to the current time and the processor exits this routine.

If Q1 contains entries of lines waiting for service, the first entry in Q1 is examined and the line is identified as shown in box 602. The waiting time for this customer (customer I) is now calculated (box 604) by deducting the current time from the time of arrival that was stored in Q1 when the service request was first recognized. This waiting time designated TI is now compared to a threshold value, for exampve 10 seconds, as shown in box 605. If the threshold has not been exceeded, the customer TI is left in queue Q1, and Q1 is examined for additional entries as processor 301 executes box 608.

At this point in the operation of processor 301 if no other lines are waiting in queue Q1 the processor exits from the routine shown in FIG. 6. However, if additional lines are found in Q1 the index for identifying the line being examined is incremented by 1 and the next entry in Q1 is examined (box 609).

When executing box 605, if the processor found that the line identified exceeded a threshold value, processor 301 would execute box 606 to ascertain if the line is an essential line. Finding the line essential and entitled to priority service, processor 301 removes the line from Q1 and enters the same information at the bottom of Q2 as shown in box 607. Q1 is then reexamined by processor 301 to ascertain if there are any more entries therein as shown in box 608, and this process is repeated until all lines that exceed this threshold are removed from Q1 and inserted in Q2.

Figure 5:
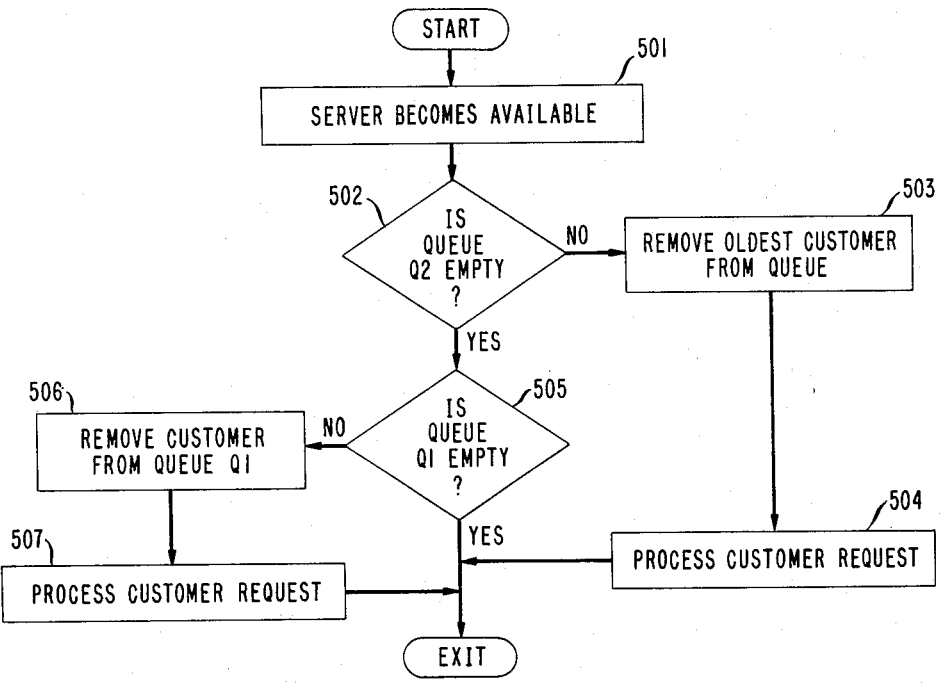

The manner in which the queues are served is depicted in the flow chart of FIG. 5. As shown in box 501 this routine is entered by processor 301 when a server becomes available.

The term "server" is used herein in a generic sense to indicate the equipment that may be engaged for advancing the progress of a call after a service request has been recognized, and this equipment may differ among the various switching systems depending on the needs of a particular system involved. For example, in some systems an available digit receiver must now be engaged and coupled to the line to give a customer dial tone, while in other systems the processor itself operating on different subroutines as disclosed herein may be the server.

In any event, when the server becomes available the routine depicted in FIG. 5 is entered and the high priority queue Q2 is examined. If any entries are found in Q2, the oldest is removed from the queue so that the essential line waiting for service for the longest interval is served first.

The oldest entry in queue Q2 is processed and as long as there are any entries in Q2 these will be served while the server is available. If a server is still available when Q2 is empty, processor 301 examines Q1 to ascertain if any other lines are waiting for service as shown in box 505. All the lines in Q1 are then served as processor 301 executes boxes 506 and 507, and the routine is exited after all customers have been served or if the server is no longer available.

Thus, it can be seen from FIG. 5 that once processor 301 has emptied Q2 and served the lines on a priority basis the remaining processing capacity is utilized to serve nonessential lines and more recent requests on essential lines.

In the above description the term "line" was used with reference to the entries made in the various queues. It will be understood, of course, that a similar priority service arrangement could be implemented for trunks and other circuits without departing from the spirit and scope of the invention.

Also, it is not necessary that the queues contain all line identification information for those lines requesting service. In certain systems it may be advantageous merely to put indicators or pointers in the queue and have these indicators point to a larger data block of information in memory 300. Similarly, the pointer may direct a processor to a data block which summarizes the status of a group of lines. In the latter case, processor 301 will cause the line unit 112 to perform a directed scan of each of the lines to determine if the particular line requesting service in that group is entitled to essential service.

It is to be understood that the arrangements described herein are merely illustrative of the applications of the principles of the invention and that numerous other arrangements may be devised by those skilled in the art without departing from the spirit and scope of the invention.

What is claimed is:

1. For use in a telecommunication system having a switching system serving a plurality of customer stations wherein said stations are grouped according to at least two classes of service, a method for preferentially serving at least one of said station groups comprising the steps of entering in a first queue in response to each request for service from individual ones of said stations the station identity and time of arrival of each said service request, examining each entry in the first queue to ascertain the length of time said entry is in said first queue, identifying the class of service of entries in the first queue that have remained in the first queue in excess of a predetermined threshold time, placing in a second queue only those identified entries having a particular class of service, and serving the stations entered in the second queue at a different rate than the stations entered in the first queue.

2. The invention set forth in claim 1 wherein the step of serving the stations comprises the step of emptying the second queue before providing service to entries in the first queue.

3. The invention set forth in claim 1 wherein the step of serving the stations comprises the step of loading and unloading the second queue on a first-in/first-out basis.

4. For use in a telecommunication system having a plurality of customer stations and a switching system including means for serving requests for service from said stations wherein said stations are arranged in class of service groups, a method for allocating said serving means among the station groups comprising the steps of entering in a first queue in response to each request for service from individual ones of said stations the station identity and time of arrival of each said service request, examining each entry in the first queue to ascertain the length of time the entry is in said first queue, identifying the class of service of entries in the first queue that have remained in the first queue in excess of a predetermined threshold time, placing in a second queue in the order of their arrival time those entries identified in the first queue that have a first class of service, and connecting the customer stations identified by the second queue entries to the serving means in the order of their arrival times and prior to connecting to the serving means customer stations identified by first queue entries.

5. The invention set forth in claim 1 or 4 wherein the step of examining entries in the first queue is periodically performed independently of the number of service requests.

6. For use in a telephone switching system having a processor for serving a plurality of subscriber lines wherein the lines are assigned a class of service from a plurality of classes of service, a method of essential service protection to give preferential service to a particular class of service comprising the steps of storing in a first queue the identity of each line requesting service and the time of arrival of each service request, ascertaining the entries stored in the first queue that have remained in the first queue in excess of a predetermined threshold, determining the class of service of the line associated with each ascertained entry, placing in a second queue only those ascertained entries of lines having a particular class of service, and causing the processor to serve lines identified by entries in the second queue prior to lines identified by entries in the first queue.

* * * * *